US012619991B2

(12) United States Patent
Teekaramsingh et al.

(10) Patent No.: US 12,619,991 B2
(45) Date of Patent: May 5, 2026

(54) CONTROL OF NETWORK SYSTEMS FOR AUTOMATIC ASSESSMENT AND REMEDIATION OF PROCESSING ANOMALIES

(71) Applicant: Truist Bank, Charlotte, NC (US)

(72) Inventors: Omganesh Teekaramsingh, Johns Creek, GA (US); Louis Allin, Richmond, VA (US); Jonathan Topp, Montpelier, VA (US); Madhu Babu Martheneni, Cumming, GA (US); Lenin Kumar Pagidipala, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/902,312

(22) Filed: Sep. 30, 2024

(65) Prior Publication Data

US 2025/0021983 A1 Jan. 16, 2025

Related U.S. Application Data

(63) Continuation of application No. 18/065,127, filed on Dec. 13, 2022, now Pat. No. 12,141,809.

(51) Int. Cl.
G06Q 20/40 (2012.01)

(52) U.S. Cl.
CPC ................................. G06Q 20/4016 (2013.01)

(58) Field of Classification Search
CPC ............ G06Q 20/4016; G06Q 20/4015; G06F 16/2365; G06F 9/466; G06F 11/079; G06F 11/00

USPC .................................. 707/687, 690, 691, 703
See application file for complete search history.

(56) References Cited

U.S. PATENT DOCUMENTS

| | | | | |
|---|---|---|---|---|
| 10,460,294 B1* | 10/2019 | Thomas | ............. | G06Q 20/4016 |
| 10,986,116 B1* | 4/2021 | Ur | ........................... | H04L 43/50 |
| 11,775,977 B1 | 10/2023 | Kruse et al. | | |
| 2003/0023557 A1* | 1/2003 | Moore | ............. | G07B 17/00435 705/50 |

(Continued)

OTHER PUBLICATIONS

U.S. Appl. No. 18/065,127 , "Non-Final Office Action", Apr. 19, 2024, 26 pages.

(Continued)

*Primary Examiner* — Phong H Nguyen
(74) *Attorney, Agent, or Firm* — Kilpatrick Townsend & Stockton LLP; Michael A. Springs, Esq.

(57) ABSTRACT

A remote deposit capture (RDC) processing anomaly detection and remediation tool that can communicate with the RDC system over a network, and determine whether a RDC transaction is missing from the RDC system by comparing created and assigned unique identifiers represented in RDC transaction data received at a selected RDC system location or component with unique identifiers represented in RDC transaction data received at a RDC system location or component that is upstream thereof. In response to finding a missing RDC transaction, the tool can determine one or more RDC system remediation actions, execute the one or more RDC system remediation actions on the RDC system, and report the missing RDC transaction and any RDC system remediation actions executed on the RDC system.

20 Claims, 4 Drawing Sheets

(56)         References Cited

U.S. PATENT DOCUMENTS

| | | | |
|---|---|---|---|
| 2016/0019534 A1* | 1/2016 | Sidhu | G06Q 20/38 |
| | | | 705/39 |
| 2019/0034254 A1* | 1/2019 | Nataraj | G06F 11/0709 |
| 2020/0012765 A1* | 1/2020 | Smaiely | H04L 9/3297 |
| 2022/0343329 A1* | 10/2022 | Wang | G06N 20/00 |
| 2024/0013221 A1* | 1/2024 | Kruse | G06N 20/00 |
| 2024/0193606 A1 | 6/2024 | Teekaramsingh et al. | |

OTHER PUBLICATIONS

U.S. Appl. No. 18/065,127 , "Notice of Allowance", Aug. 14, 2024, 10 pages.

* cited by examiner

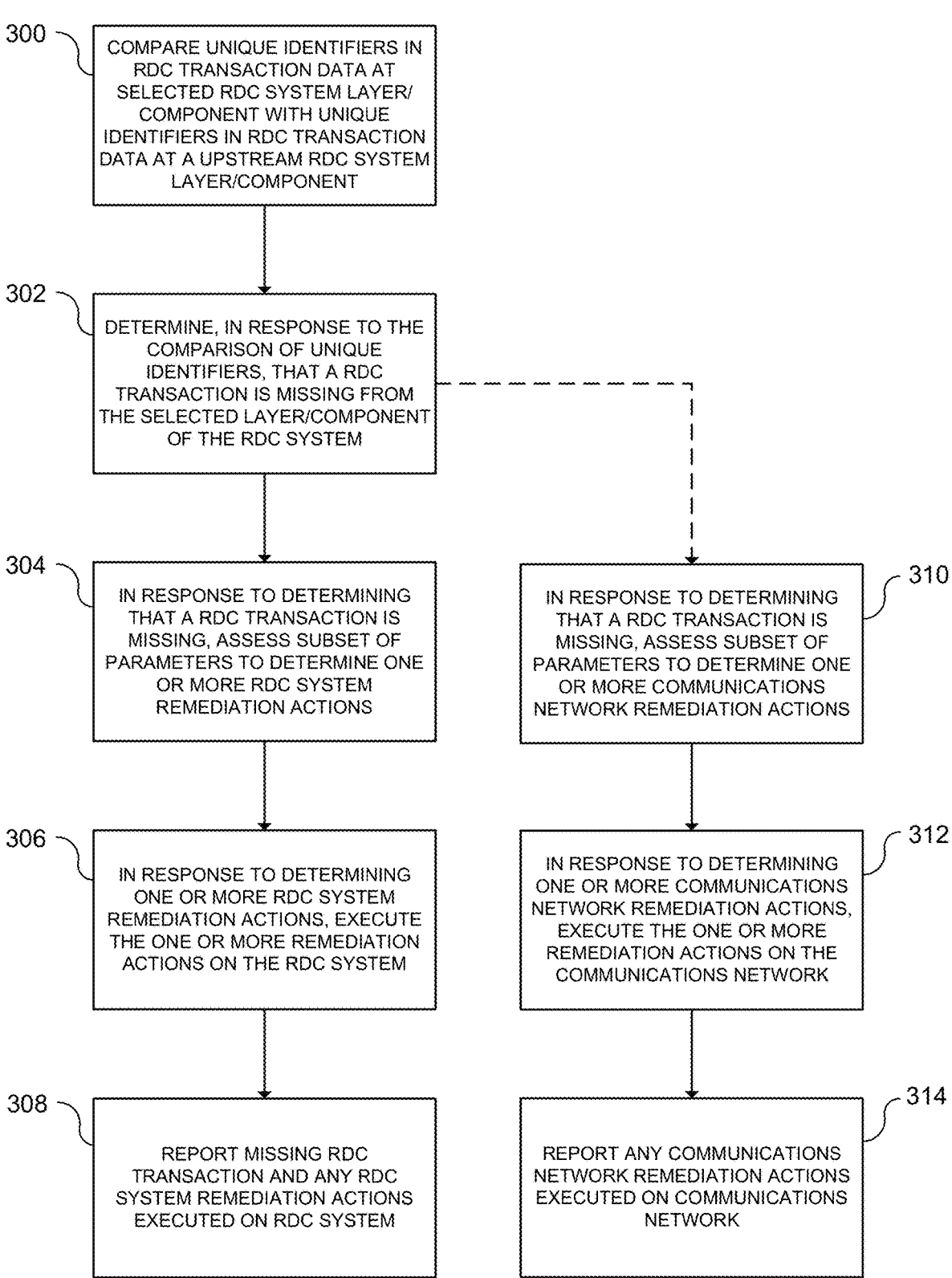

300 — COMPARE UNIQUE IDENTIFIERS IN RDC TRANSACTION DATA AT SELECTED RDC SYSTEM LAYER/ COMPONENT WITH UNIQUE IDENTIFIERS IN RDC TRANSACTION DATA AT A UPSTREAM RDC SYSTEM LAYER/COMPONENT

302 — DETERMINE, IN RESPONSE TO THE COMPARISON OF UNIQUE IDENTIFIERS, THAT A RDC TRANSACTION IS MISSING FROM THE SELECTED LAYER/COMPONENT OF THE RDC SYSTEM

304 — IN RESPONSE TO DETERMINING THAT A RDC TRANSACTION IS MISSING, ASSESS SUBSET OF PARAMETERS TO DETERMINE ONE OR MORE RDC SYSTEM REMEDIATION ACTIONS

310 — IN RESPONSE TO DETERMINING THAT A RDC TRANSACTION IS MISSING, ASSESS SUBSET OF PARAMETERS TO DETERMINE ONE OR MORE COMMUNICATIONS NETWORK REMEDIATION ACTIONS

306 — IN RESPONSE TO DETERMINING ONE OR MORE RDC SYSTEM REMEDIATION ACTIONS, EXECUTE THE ONE OR MORE REMEDIATION ACTIONS ON THE RDC SYSTEM

312 — IN RESPONSE TO DETERMINING ONE OR MORE COMMUNICATIONS NETWORK REMEDIATION ACTIONS, EXECUTE THE ONE OR MORE REMEDIATION ACTIONS ON THE COMMUNICATIONS NETWORK

308 — REPORT MISSING RDC TRANSACTION AND ANY RDC SYSTEM REMEDIATION ACTIONS EXECUTED ON RDC SYSTEM

314 — REPORT ANY COMMUNICATIONS NETWORK REMEDIATION ACTIONS EXECUTED ON COMMUNICATIONS NETWORK

FIG. 3

CONTROL OF NETWORK SYSTEMS FOR AUTOMATIC ASSESSMENT AND REMEDIATION OF PROCESSING ANOMALIES

CROSS-REFERENCE TO RELATED APPLICATIONS

The present application is a continuation of U.S. patent application Ser. No. 18/065,127, filed Dec. 13, 2022, titled "CONTROL OF NETWORK SYSTEMS FOR AUTO-MATIC ASSESSMENT AND REMEDIATION OF PROCESSING ANOMALIES," the entirety of which is incorporated herein by reference.

TECHNICAL FIELD

The present disclosure relates generally to network communication and information processing, and more particularly, although not exclusively, to automatically assessing and remediating electronic transaction processing anomalies.

BACKGROUND

Networks, such as those used for allowing electronic communications or exchanging or processing files, may be complex systems having multiple layers and components that depend on proper interaction to avoid anomalies such as delays, errors, or failures. The various layers or components of network systems may also reside at separate locations, which can introduce additional opportunities for processing anomalies and can complicate the operation of assessing and remediating anomalies that arise.

As one example, a network may be used to receive and process data files. Such a network may have multiple layers and various interconnected hardware and software components for performing processing operations. For example, a network may include an intake or input layer via which a data file(s) may be received from a user, a core layer where data in the data file may be analyzed, organized, or converted, and a processing layer where the data is finally processed and output, stored, or transmitted elsewhere. One particular example of such a network is a remote deposit capture (RDC) system. RDC is a process by which a paper check is digitized, and the digitized check image is transmitted along with other deposit data through a network comprising multiple processing layers and components before the transaction associated with the check is completed. Digitization of a check and initiation of a RDC transaction commonly occurs at a location remote from the location of final transaction processing, and there may also be intermediate processing layers and components through which the digitized check image and deposit data must pass before reaching the final destination. As a result, the RDC process is ripe with opportunities for processing anomalies.

Assessing and remediating network processing anomalies across complex networks using human operators can be expensive, as human operators must be paid, and also require various computer or other systems to perform assessment and remediation operations. Assessing and remediating network processing anomalies using human operators can also be inefficient, as natural human limitations affect the speed with which anomalies can be addressed and the volume of anomalies that can be investigated and remediated within a given period of time. Moreover, providing human operators with the access necessary to assess and remediate network anomalies may further add to the complexity of already complicated network systems. Networks may also process high volumes of data, which can increase the number of human operators and associated hardware resources required to remediate network anomalies, and may lead to remediation delays.

SUMMARY

According to one example of the present disclosure, a computerized tool for detecting and remediating electronic transaction processing anomalies in a RDC system may include a database, a processor communicatively coupled to the database, and memory that is communicatively coupled to the processor and includes instructions that are executable by the processor to cause the processor to perform operations. The operations may include communicating with the RDC system over a network, and receiving RDC transaction data for RDC transactions initiated via the RDC system. The operations may also include creating for each RDC transaction a unique identifier comprising selected items of deposit information extracted from the RDC transaction data received for each RDC transaction, and assigning each unique identifier to a corresponding RDC transaction. The operations may also include determining that a RDC transaction is missing from a selected RDC system location or component by comparing the unique identifiers represented in RDC transaction data received at the selected RDC system location or component with the unique identifiers represented in RDC transaction data received at a RDC system location or component that is upstream of the selected RDC system location or component. The operations may additionally include, in response to determining that a RDC transaction is missing from the selected RDC system location or component, creating a missing transaction record that includes at least information identifying the missing RDC transaction and the selected RDC system location or component from which the RDC transaction is missing, and storing the missing transaction record in the database. The operations may further include, in response to determining that a RDC transaction is missing from the selected RDC system location or component, assessing a subset of parameters selected based on information from the missing transaction record, to determine one or more RDC system remediation actions. The operations may still further include, in response to determining the one or more RDC system remediation actions, executing the one or more RDC system remediation actions on the RDC system, and reporting the missing RDC transaction and any RDC system remediation actions executed on the RDC system.

According to another example of the present disclosure, a non-transitory computer-readable medium may contain instructions that are executable by a processor to cause the processor to perform operations. The operations may include communicating with the RDC system over a network, and receiving RDC transaction data for each RDC transaction initiated via the RDC system. The operations may also include creating for each RDC transaction a unique identifier comprising selected items of deposit information extracted from the RDC transaction data received for each RDC transaction, and assigning each unique identifier to a corresponding RDC transaction. The operations may also include determining that a RDC transaction is missing from a selected RDC system location or component by comparing the unique identifiers represented in RDC transaction data received at the selected RDC system location or component with the unique identifiers represented in RDC transaction data received at a RDC system location or component that is upstream of the selected RDC system location or component. The operations may additionally include, in response to determining that a RDC transaction is missing from the selected RDC system location or component, creating a missing transaction record that includes at least information identifying the missing RDC transaction and the selected RDC system location or component from which the RDC transaction is missing, and storing the missing transaction record in the database. The operations may further include, in response to determining that a RDC transaction is missing from the selected RDC system location or component, assessing a subset of parameters selected based on information from the missing transaction record, to determine one or more RDC system remediation actions. The operations may still further include, in response to determining the one or more RDC system remediation actions, executing the one or more RDC system remediation actions on the RDC system, and reporting the missing RDC transaction and any RDC system remediation actions executed on the RDC system.

According to a further example of the present disclosure, a method of detecting and remediating electronic transaction processing anomalies in a RDC system using a computerized tool may include communicating with the RDC system over a network using the computerized tool, and receiving at the computerized tool from the RDC system, RDC transaction data for each RDC transaction initiated via the RDC system. The method may also include creating, by the computerized tool, a unique identifier comprising selected items of deposit information extracted from the RDC transaction data received for each RDC transaction, and assigning each unique identifier to a corresponding RDC transaction. The method may also include determining, by the computerized tool, that a RDC transaction is missing from a selected RDC system location or component by comparing the unique identifiers represented in RDC transaction data received at the selected RDC system location or component with the unique identifiers represented in RDC transaction data received at a RDC system location or component that is upstream of the selected RDC system location or component. The method may additionally include, in response to determining that a RDC transaction is missing from the selected RDC system location or component, creating by the computerized tool, a missing transaction record including at least information identifying the missing RDC transaction and the selected RDC system location or component from which the RDC transaction is missing, and storing the missing transaction record in a database of the computerized tool. The method may further include, in response to determining that a RDC transaction is missing from the selected RDC system location or component, assessing by the computerized tool, a subset of parameters selected based on information from the missing transaction record, to determine one or more RDC system remediation actions. The operations may still further include, in response to determining the one or more RDC system remediation actions, executing by the computerized tool, the one or more RDC system remediation actions on the RDC system, and reporting, by the computerized tool, the missing RDC transaction and any RDC system remediation actions executed on the RDC system.

BRIEF DESCRIPTION OF THE DRAWINGS

FIG. 3 is a flowchart generally representing a process for automatically detecting and remediating remote deposit capture transaction processing anomalies according to another example of the present disclosure.

DETAILED DESCRIPTION

Certain aspects and examples of the present disclosure generally relate to a computerized tool for monitoring and controlling network systems to detect and remediate processing anomalies, such as data processing anomalies. Examples of the computerized tool may, for example, be used in conjunction with remote deposit capture (RDC), which utilizes a networked system of components disposed in various layers to receive and process remotely submitted digitized checks.

According to an aspect of the present disclosure, the computerized tool may associate a unique identifier with each RDC transaction present in RDC transaction data received by the computerized tool from the RDC system and, when a transaction is determined to be missing from a given layer or component of the RDC system, may automatically assess the RDC system for anomalies and execute one or more remediation actions on the RDC system. Examples of the computerized tool may further automatically assess for anomalies, the network over which components of the RDC system communicate, and may execute one or more remediation actions on the communications network.

Detecting and remediating electronic transaction processing anomalies automatically using a computerized tool according to the present disclosure can eliminate or reduce the need for human operators performing like functions and thereby reduce costs. Detecting and remediating network anomalies automatically using a computerized tool can also result in corrective actions occurring more quickly when anomalies arise, which can increase system efficiency and improve customer confidence.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

Figure 1:
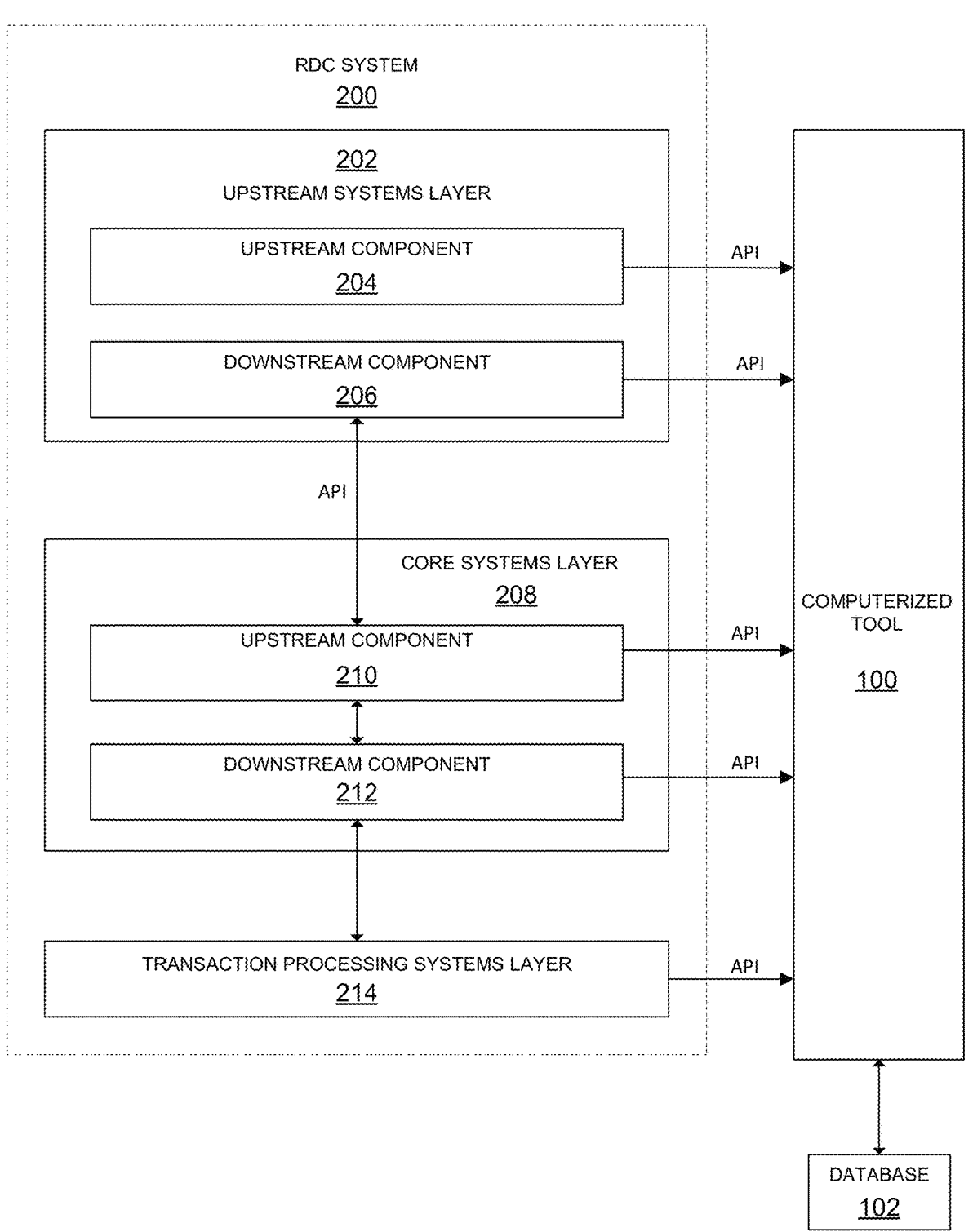
FIG. 1 schematically represents a computerized tool for detecting and remediating anomalies associated with a remote deposit capture system, according to an example of the present disclosure.

FIG. 1 is a schematic block diagram of a computerized tool 100 for detecting and remediating electronic transaction processing anomalies in communication over a network with a data capture system 200 according to one example of the present disclosure. In the example depicted in FIG. 1, the data capture system 200 is a RDC system for receiving and processing RDC transactions. While the RDC system is described in detail below for purposes of illustrating examples of the computerized tool and its associated operation for detecting and remediating electronic transaction processing anomalies, the computerized tool may also be used with other data capture system implementations and examples.

As represented in FIG. 1, the RDC system 200 may include an upstream systems layer 202. The upstream systems layer 202 may include an upstream component 204 through which users can transmit digital check images and related non-image deposit data for subsequent processing and deposit. The upstream systems layer 202 may also include a downstream component 206 that resides downstream of the upstream component 204 and may facilitate subsequent downstream transmission of RDC transaction data in the form of digital (e.g., scanned) check images and related non-image deposit data such as, without limitation, various identifying information about the deposit and the depositor.

The RDC system 200 example of FIG. 1 is also shown to include a core systems layer 208. The core systems layer may include an upstream component 210, which may be in the form of a frontend application configured to receive network-transmitted RDC transaction data from the downstream component 206 or another downstream component of the upstream systems layer 202. The upstream component 210 of the core systems layer may perform various functions, such as but not limited to, digital check image assessment and balancing functions.

The core systems layer 218 may also include a backend downstream component 212, which may receive RDC transaction data from the upstream component 210 and transmit said RDC transaction data downstream for further processing (e.g., check clearing, check depositing). For example, the downstream component 212 may generate a X9 (federal standard format) batch file that contains both check image data and non-image deposit data associated with the RDC transactions transmitted from the upstream component 210.

The batch file created by the downstream component 212 of the core systems layer 208 may be transmitted to a downstream transaction processing systems layer 214. The transaction processing systems layer 214 typically processes the batch files received from the core systems layer 208 (e.g., from the downstream component 212) of the RDC system 200. The transaction processing systems layer 214 may include multiple different components for performing various operations such as, for example, analysis, clearing and deposit operations.

The computerized tool 100 may communicate via APIs with the upstream systems layer 202 of the RDC system 200. The computerized tool 100 may also receive from the RDC system 200, data associated with RDC transactions initiated through the RDC system.

Subsequent to receipt of the RDC transaction data, the computerized tool 100 may create a unique identifier for each RDC transaction, and assign each unique identifier to a corresponding RDC transaction. The unique identifiers may be stored in a database 102 associated with the computerized tool. To conserve memory resources and reduce required processing power, the unique identifier may be comprised of selected items of RDC transaction (e.g., deposit) information extracted from the larger totality of RDC transaction data received for each RDC transaction. By way of example, and without limitation, a unique identifier may be a combination of only the deposit ID, date, time, and item sequence number associated with a given RDC transaction by the RDC system 200.

As described in more detail below, the unique identifiers may be used by the computerized tool 100 to track the progress of RDC transactions through the RDC system 200 and to detect missing RDC transactions, while requiring that only a minimal amount of RDC transaction data be stored and processed. The storage and processing of only a minimal amount of RDC transaction data relative to RDC tracking and comparison functions conserves memory and processor resources that may be used for other operations, such as assessment and remediation operations.

The computerized tool 100 may also communicate via APIs with the cores systems layer 208 of the RDC system 200. This communication allows the computerized tool 100 to track the progress of RDC transactions from the upstream systems layer 202 to the core systems layer 208 of the RDC system 200, as well as through the core systems layer and to the transaction processing systems layer 214 of the RDC system.

According to one aspect of the present disclosure, the computerized tool 100 may determine that a RDC transaction is missing from a selected location of the RDC system 200. The selected location of the RDC system may be a selected layer or component of the RDC system 200. For example, the computerized tool 100 may compare the unique identifiers represented in RDC transaction data received at a selected layer or component of the RDC system with the unique identifiers represented in RDC transaction data received at a RDC system layer or component that is upstream of the selected RDC system layer or component and determine, in response to the comparison of unique identifiers, whether a RDC transaction is missing from the selected RDC system layer or component.

According to one example, the computerized tool 100 may determine that a RDC transaction is missing from RDC transaction data received by the core systems layer 208 from the upstream systems layer 202. In this regard, the computerized tool 100 may compare the unique identifiers of RDC transactions represented in the RDC transaction data at the upstream component 210 of the core systems layer 208 with the unique identifiers of RDC transactions represented in the RDC transaction data at the downstream component 206 of the upstream systems layer 202, and determine whether a RDC transaction is missing at the upstream component 210 of the core systems layer 208.

According to another example, the computerized tool 100 may determine that a RDC transaction is missing from RDC transaction data transmitted between components within a RDC system core systems layer. For example, in the case of the RDC system core systems layer 208 of FIG. 1, the computerized tool 100 may compare the unique identifiers of RDC transactions represented in the RDC transaction data at the downstream component 212 with the unique identifiers of RDC transactions represented in the RDC transaction data at the upstream component 210, and determine whether a RDC transaction is missing at the downstream component 212.

According to another example, the computerized tool 100 may determine whether a RDC transaction is missing from the RDC transaction data received by the transaction processing systems layer 214 from the upstream core systems layer 208 of the RDC system 200. In this regard, the computerized tool 100 may compare the unique identifiers of RDC transactions represented in the RDC transaction data at one or more processing components of the transaction processing systems layer 214 with the unique identifiers of RDC transactions represented in the RDC transaction data at the downstream component 212 of the core systems layer 208, and determine whether a RDC transaction is missing from the transaction processing systems layer 214.

Determining by the computerized tool whether a RDC transaction is missing from a given RDC system layer or component by comparing only unique identifiers, rather than the totality of the data associated with the RDC transactions, further minimizes required memory and processing resources, and conserves memory and processing resources for other uses, such as use in assessment and remediation operations.

According to another aspect of the present disclosure, determining that a RDC transaction is missing from a selected RDC system layer or component may result in the creation of a missing transaction record. A missing transaction record may include various types of information, such as information that identifies the missing RDC transaction. The information identifying the missing RDC transaction may include, for example, various identifying information about the deposit. As one example, the identifying information may include deposit data associated with the missing RDC transaction, such as without limitation, the deposit ID (e.g., the MICR line data from the paper check), the date of the deposit, the time of the deposit, and the location of the deposit. The information identifying the missing RDC transaction may also include information about the depositor, such as without limitation the name, address, or phone number of the depositor. The information identifying the missing RDC transaction may also include an identification of the selected RDC system location or component from which the RDC transaction is missing. An identification of the selected RDC system location or component from which the RDC transaction is missing may be a RDC system layer or component level description, and may be provided in any format that is readable by the computerized tool 100.

The information provided in the missing transaction record may be accessed by the computerized tool 100 and used to assist the computerized tool 100 in assessing the RDC system 200. For example, including in the missing transaction record, the RDC system location or component from which the RDC transaction is missing, may allow the computerized tool 100 to investigate the RDC system 200 effectively and efficiently for operation anomalies, because the location information indicates the most likely source of a problem. The RDC system location from which the RDC transaction is missing, may also function as a good remediation starting point from which the remediation process can branch out if necessary.

Similarly, including in the missing transaction record, various information that identifies the missing RDC transaction, may help the computerized tool 100 perform data analysis operations during assessment of the RDC system 200, such as for example, detecting a corruption or loss of RDC transaction data between an upstream and downstream RDC system location. The computerized tool 100 may also be able to use missing transaction identifying information from the missing transaction record to locate a missing RDC transaction by other than an assigned unique identifier. For example, the computerized tool 100 may be able to locate a missing RDC transaction during an assessment operation by analyzing data that is present at the location of the missing RDC transaction and is associated with the missing RDC transaction, but is other than the deposit data used to create the unique identifier assigned to the missing RDC transaction.

Computerized tool examples may include an assessment and remediation module. According to an aspect of the present disclosure, an assessment and remediation module may perform different RDC system or communications network anomaly assessment and remediation functions.

Examples of assessment and remediation modules according to the present disclosure may include one or more submodules and applications for performing RDC system or communications network assessment and anomaly remediation actions. An assessment and remediation module may also include its own processor or memory.

Assessment of the RDC system 200 for anomalies is not limited to a particular technique(s). Instead, according to an aspect of the present disclosure, RDC system assessment may include various diagnostic procedures. As one example, and without limitation, the computerized tool 100 may cause a test data transmission to be sent from an upstream RDC system location or component to the RDC system location or component from which the RDC transaction is missing, and may analyze the results of the test data transmission for anomalies (e.g., non-transmission, delayed transmission, lost data).

The computerized tool 100 may also utilize additional information about the components, construction, or operation of the RDC system 200 and the RDC system communications network when assessing the RDC system or the communications network for anomalous operation. For example, the computerized tool may be provided with construction or operational parameters for the RDC system 200 or the communications network, and the computerized tool 100 may assess a subset of the parameters, selected based on information from the missing transaction record, to determine one or more RDC system or communications network remediation actions to undertake.

In response to determining one or more RDC system remediation actions to be undertaken, the computerized tool 100 may then execute the one or more RDC system remediation actions on the RDC system. If the RDC system anomaly is a system hardware problem, for example a problem(s) with a system device, the computerized tool 100 may attempt to remediate the problem using a generic remediation technique such as a rebooting operation, or may utilize a remediation technique that is more specific to the affected device. If the anomaly is a system application problem, the computerized tool 100 may attempt to remediate the problem by, for example, restarting or reloading the application. If the anomaly is a data problem, for example, corrupted or partially/wholly missing data, the computerized tool 100 may operate on the data. As an example, to remediate a corrupted or lost data problem, the computerized tool 100 may replace the corrupted data or may cause the entirety of the RDC transaction data present at an upstream location or component to be retransmitted to the RDC system location or component from which the RDC transaction is missing. In this manner, the missing RDC transaction can be subsequently processed by the RDC system layer or component from which it was previously missing, and may thereafter be tracked through downstream RDC system layers or components by the assigned unique identifier.

Subsequent to executing one or more RDC system remediation actions on the RDC system 200, the computerized tool 100 may report the missing RDC transaction and any RDC system remediation actions executed on the RDC system 200. Reporting RDC system remediation actions executed on the RDC system may include reporting the results of the RDC system remediation actions. Reporting a missing RDC transaction or a remediation action may involve merely entering related information into a file, such as an event log file. Reporting information may be saved in the computerized tool database 102. Reporting a missing RDC transaction or a remediation action may also involve notifying a human operator.

Examples of the computerized tool 100 may also assess the communications network(s) over which RDC system layers and components communicate to detect any network anomalies affecting RDC transaction transmission. Communications network assessment may be conducted using any communications network investigation or diagnostic techniques known to those of skill in the art. For example, the computerized tool 100 may look for IP and connectivity problems, may utilize structured techniques such as top-down or bottom-up troubleshooting techniques, may perform a root cause analysis, etc. As another example, the computerized tool 100 may attempt to establish communication with a given network device using the device IP address or other information that identifies the device on the communications network. Subsequent to establishing communication, the computerized tool 100 may receive from the network device, diagnostic or other data that may be used to ascertain the operating status of the device. Alternatively, a failure to establish communication with a given network device may indicate a problem with the device. As in the case of assessing the RDC system 200, the computerized tool 100 may assess a subset of parameters selected based on information from the missing transaction record, to determine one or more communications network remediation actions to undertake.

In response to determining one or more communications network remediation actions to be undertaken, the computerized tool 100 may attempt to automatically execute the one or more communications network remediation actions on the communications network. Communications network anomaly remediation may be conducted using any relevant remediation techniques known to those of skill in the art. For example, the computerized tool 100 may attempt to reboot a communications network device experiencing an operating anomaly. If the communications network anomaly is a communications network application anomaly, the computerized tool 100 may attempt to remediate the anomaly by, for example, restarting or reloading the application. The computerized tool 100 may similarly act to remediate other hardware and software problems, may free up network memory by deleting unnecessary data in the case of an anomaly caused by a shortage of memory, etc.

Subsequent to executing one or more communications network remediation actions on the communications network, the computerized tool 100 may report the missing RDC transaction and any communications network remediation actions executed on the communications network. Reporting communications network remediation actions executed on the communications network may include reporting the results of the communications network remediation actions. Reporting a missing RDC transaction or a communications network remediation action may involve merely entering related information into a file, such as an event log file. Reporting information may be saved in the computerized tool database 102. Reporting a missing RDC transaction or a communications network remediation action may also involve notifying a human operator.

Figure 2:
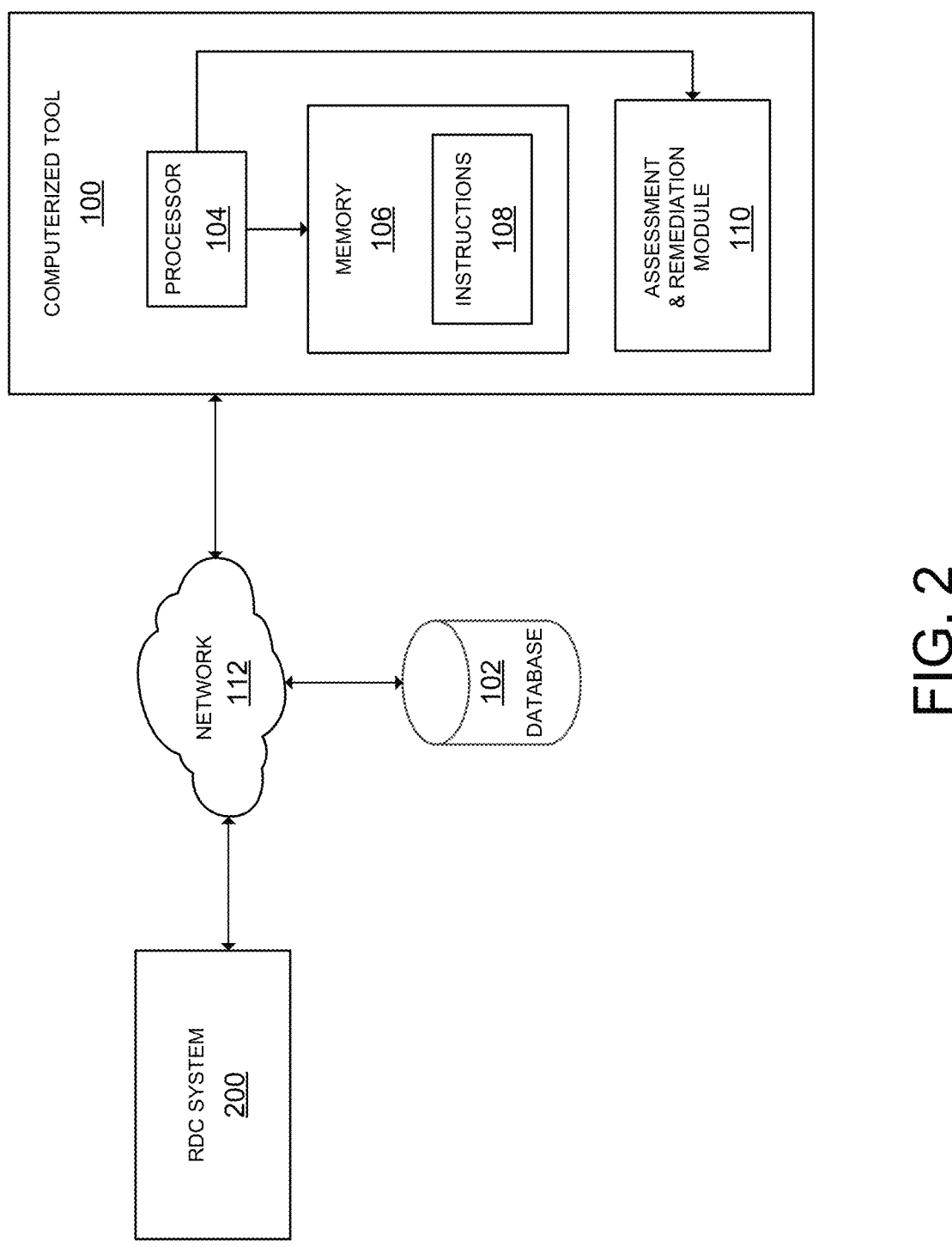
FIG. 2 is a block diagram depicting various components of a computerized tool for detecting and remediating anomalies associated with a remote deposit capture system, according to an example of the present disclosure.

FIG. 2 is a block diagram depicting various components of one example of a computerized tool according to an example of the present disclosure, such as the computerized tool 100 for detecting and remediating electronic transaction processing anomalies described above with respect to the schematic diagram of FIG. 1. As depicted in FIG. 2, the computerized tool 100 may include a processor 104 that is communicatively coupled to a memory 106. The processor 104 may also be communicatively coupled to the computerized tool database 102, which may be located remotely from the processor and in communication with the processor over a network 112. The computerized tool 100 is also shown to communicate with the RDC system 200 over the network 112.

The processor 104 can include one processing device or multiple processing devices. Non-limiting examples of the processor 104 include a Field-Programmable Gate Array (FPGA), an application-specific integrated circuit (ASIC), a microprocessor, etc. The processor 104 can execute the instructions 108 stored in the memory 106 to perform operations, such as the operations described above. In some examples, the instructions 108 can include processor-specific instructions generated by a compiler or an interpreter from code written in a suitable computer-programming language, such as C, C++, C#, etc.

The memory 106 can include one memory or multiple memories. The memory 106 can be non-volatile and may include any type of memory that retains stored information when powered off. Non-limiting examples of the memory 106 include electrically erasable and programmable read-only memory (EEPROM), flash memory, or any other type of non-volatile memory. At least some of the memory 106 can be a non-transitory, computer-readable medium from which the processor 104 can read the instructions 108. A computer-readable medium can include electronic, optical, magnetic, or other storage devices capable of providing the processor 104 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 104 can read the instructions 108.

The processor 104 of the computerized tool 100 may also be communicatively coupled to the assessment and remediation module 110. As described above, the assessment and remediation module 110 functions to perform different RDC system or communications network assessment and anomaly remediation functions. According to an example of the present disclosure, the assessment and remediation module 110 of the computerized tool 100 may include one or more submodules and applications for performing RDC system or communications network assessment and anomaly remediation operations. According to an example of the present disclosure, the assessment and remediation module 110 may also include its own processors or memory.

FIG. 3 is a flowchart illustrating generally a process for detecting and remediating electronic data transactions according to some aspects of the present disclosure. The process represented in FIG. 3 is described for purposes of illustration with respect to detecting and remediating RDC transactions, however, the process can also apply to detecting and remediating various other types of electronic transactions.

In FIG. 3, the process is shown beginning with the step of comparing unique identifiers represented in RDC transaction data at a selected location or component of a RDC system with unique identifiers represented in RDC transaction data at a downstream location or component of the RDC system. As should be understood from above-described examples of the present invention, at this point, RDC transaction data will have been previously received by the computerized tool, unique identifiers will have been created for each RDC transaction from selected items of RDC transaction (e.g., deposit information) extracted from the totality of RDC transaction data received, each unique identifier will have been assigned to a corresponding RDC transaction, and the unique identifiers will have been stored in a computerized tool database.

As represented in FIG. 3, at block 300, a computerized tool according to an example of the present disclosure may initially compare unique identifiers represented in RDC transaction data at a selected location or component of a RDC system with unique identifiers represented in RDC transaction data at an upstream location or component of the RDC system. At block 302, the computerized tool may determine, in response to the comparison of unique identifiers, that a unique identifier and corresponding RDC transaction are missing from the selected layer or component of the RDC system. The method may perform the comparison and determination operations while storing and processing only a fraction of the total information included in the RDC transaction data received from the RDC system.

At block 304, in response to determining that a RDC transaction is missing, the computerized tool may assess a subset of parameters selected based on information from the missing transaction record, to determine one or more RDC system remediation actions. In response to determining the one or more RDC system remediation actions, the computerized tool may at block 306 execute the one or more RDC system remediation actions on the RDC system. At block 308, the computerized tool may further report the missing RDC transaction, and any remediation actions executed on the RDC system. Reporting any remediation actions executed on the RDC system may include reporting the results of said remediation actions.

As also represented in FIG. 3 at block 310, in response to determining that a RDC transaction is missing, the method may optionally further assess a subset of parameters selected based on information from the missing transaction record, to determine one or more communications network remediation actions. In response to determining the one or more communications network remediation actions, the computerized tool may at block 312 execute the one or more communications network remediation actions on the communications network. At block 314, the computerized tool may further report any remediation actions executed on the communications network. Reporting any remediation actions executed on the communications network may include reporting the results of said remediation actions.

Figure 4:
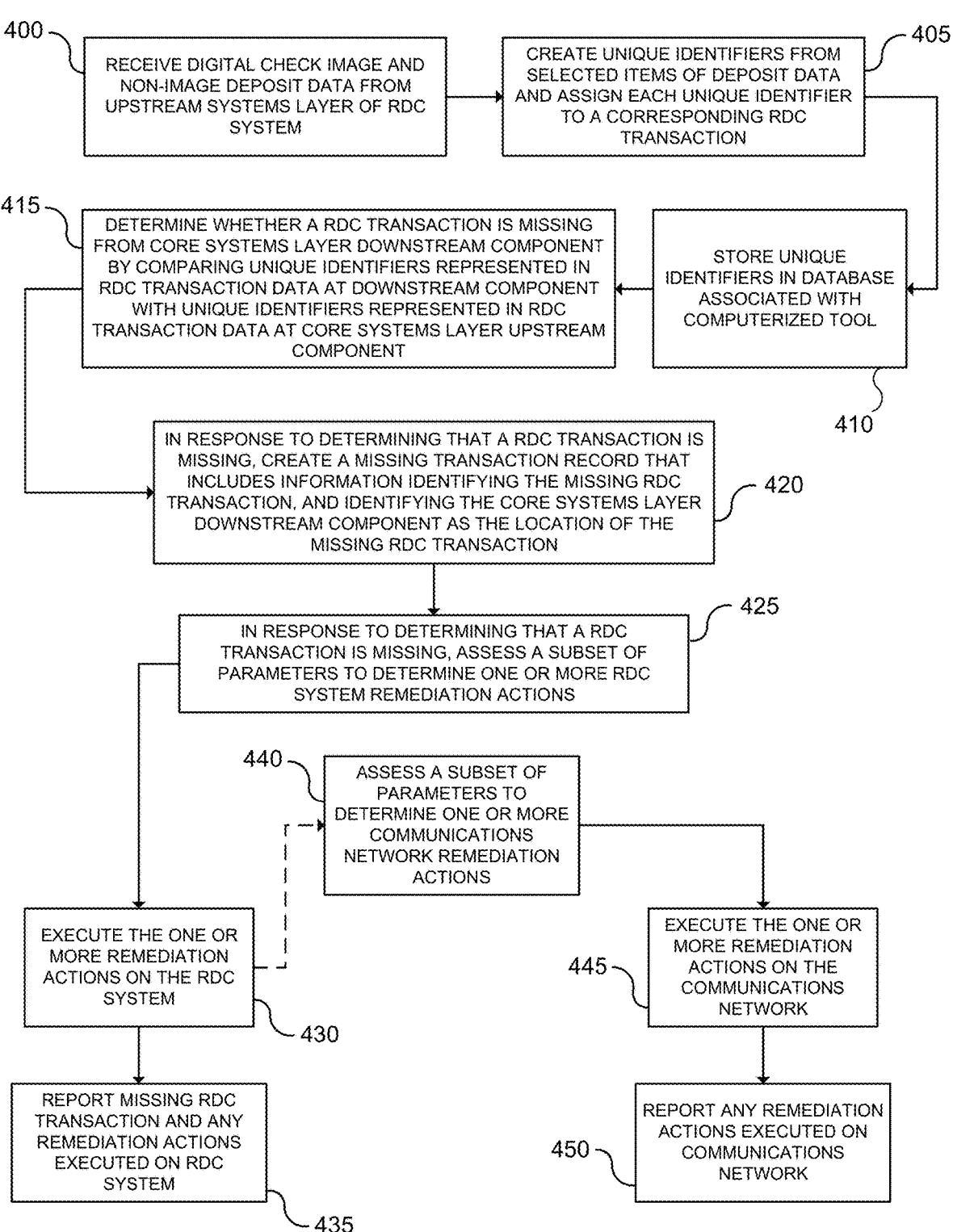
FIG. 4 is a more detailed flowchart illustrating further aspects of a process for detecting and remediating remote deposit capture transaction processing anomalies according to another example of the present disclosure.

FIG. 4 is a more detailed flowchart illustrating further aspects of a process for detecting and remediating RDC transaction processing anomalies using a computerized tool, according to another example of the present disclosure. For purposes of illustration, and not limitation, the process represented in FIG. 4 is described generally with respect to the RDC system 200 example of FIG. 1 and the computerized tool 100 example of FIG. 2, although other implementations of both are possible without departing from the scope of the present disclosure.

It can be observed that at block 400 of FIG. 4, the computerized tool may receive from the RDC system upstream systems layer a file containing a digital check image and various non-image deposit data associated with RDC transactions initiated via the RDC system. At block 405, the computerized tool may create from selected items of deposit information in the received RDC transaction data, a unique identifier that corresponds to each RDC transaction contained in the received RDC transaction data, and may assign each unique identifier to a corresponding RDC transaction. At block 410, the unique identifiers may be stored in a computerized tool database.

At block 415, the computerized tool may determine whether a RDC transaction is missing from a downstream component of the RDC system core systems layer by comparing the unique identifiers represented in RDC transaction data received at the downstream component (e.g., 212 in FIG. 1) with the unique identifiers represented in RDC transaction data received at an upstream component (e.g., 210 in FIG. 1) of the RDC system core systems layer. In response to determining that a RDC transaction is missing from the downstream component of the RDC system core systems layer, the computerized tool may create, at block 420, a missing transaction record that includes at least information identifying the missing RDC transaction and identifying the downstream component of the RDC system core systems layer as the RDC system location from which the RDC transaction is missing. The missing transaction record may be stored in the computerized tool database.

In response to determining that a RDC transaction is missing from the downstream component of the RDC system core systems layer, the computerized tool may proceed at block 425 to assess a subset of parameters selected based on information from the missing transaction record, to determine one or more RDC system remediation actions. At block 430, the computerized tool may then execute the one or more remediation actions on the RDC system. As indicated at block 435, the computerized tool may thereafter report the missing RDC transaction, and any remediation actions executed on the RDC system. Reporting any remediation actions executed on the RDC system may include reporting the results of said remediation actions.

As additionally represented in FIG. 4 at block 440, the computerized tool may optionally assess a subset of parameters selected based on information from the missing transaction record, to determine one or more communications network remediation actions. This additional assessment may occur, for example, when the computerized tool determines that the one or more remediation actions executed on the RDC system were unsuccessful at remediating the missing RDC transaction. Having performed such an assessment, the computerized tool may then at block 445 execute the one or more remediation actions on the communications network. As indicated at block 450, the computerized tool may also report any remediation actions executed on the communications network. Reporting any remediation actions executed on the communications network may include reporting the results of said remediation actions.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computerized tool for detecting and remediating anomalies in a computing system, the computerized tool comprising:

a processor; and a memory communicatively coupled to the processor, the memory including instructions that are executable by the processor to cause the processor to perform operations comprising:

receiving from the computing system, transaction data for one or more transactions initiated via the computing system;

generating a unique identifier comprising a combination of selected items of information extracted from the transaction data received for each transaction, and assigning each unique identifier to a corresponding transaction;

identifying a likely location of a computing system anomaly by determining that one or more unique identifiers are missing from a selected computing system layer or component by comparing one or more unique identifiers represented in transaction data received at the selected computing system layer or component with one or more unique identifiers represented in transaction data received at an upstream computing system layer or component;

initiating a testing operation comprising transmitting test data from the upstream computing system layer or component to the selected computing system layer or component;

analyzing the testing operation and identifying a type of the computing system anomaly as a computing system hardware problem, a computing system application problem, or a corrupted or missing transaction data problem;

in response to identifying the computing system anomaly type, assessing, by a first application associated with an assessment and remediation module of the computerized tool, a subset of computing system construction or operational parameters related to the computing system anomaly type to determine one or more computing system anomaly remediation actions; and executing, by a second application associated with the assessment and remediation module, the one or more computing system anomaly remediation actions on the computing system.

2. The computerized tool of claim 1, wherein the operations further comprise:

in response to determining that the one or more unique identifiers are missing from the selected computing system layer or component, assessing, by a third application associated with the assessment and remediation module, a subset of communications network construction or operational parameters related to the selected computing system layer or component or the upstream computing system layer or component, to determine one or more communications network remediation actions; and executing, by a fourth application associated with the assessment and remediation module, the one or more communications network remediation actions on the communications network.

3. The computerized tool of claim 2, wherein the operations further comprise executing the one or more communications network remediation actions only after execution of any computing system remediation actions.

4. The computerized tool of claim 1, wherein the operations further comprise executing the one or more computing system remediation actions at one of the selected computing system layer or component or a computing system layer or component that is upstream of the selected computing system layer or component.

5. The computerized tool of claim 1, wherein the one or more computing system anomaly remediation actions further comprise resending, to the selected computing system layer or component from an upstream computing system layer or component, transaction data containing the missing one or more unique identifiers.

6. The computerized tool of claim 1, wherein the operations further comprise determining that the one or more unique identifiers are missing from other layers or components of the computing system that are downstream from the selected computing system layer or component.

7. The computerized tool of claim 1, wherein the computing system is a remote deposit capture computing system and the transaction data includes both alphanumeric deposit data and digitized check image data.

8. A non-transitory computer-readable medium comprising instructions that are executable by a processor of a computerized tool for causing the computerized tool to perform operations comprising:

receiving from a computing system, transaction data for one or more transactions initiated via the computing system;

generating a unique identifier comprising a combination of selected items of information extracted from the transaction data received for each transaction, and assigning each unique identifier to a corresponding transaction;

identifying a likely location of a computing system anomaly by determining that one or more unique identifiers are missing from a selected computing system layer or component by comparing one or more unique identifiers represented in transaction data received at the selected computing system layer or component with one or more unique identifiers represented in transaction data received at an upstream computing system layer or component;

initiating a testing operation comprising transmitting test data from the upstream computing system layer or component to the selected computing system layer or component;

analyzing the testing operation and identifying a type of the computing system anomaly as a computing system hardware problem, a computing system application problem, or a corrupted or missing transaction data problem;

in response to identifying the computing system anomaly type, assessing, by a first application associated with an assessment and remediation module of the computerized tool, a subset of computing system construction or operational parameters related to the computing system anomaly type to determine one or more computing system anomaly remediation actions; and executing, by a second application associated with the assessment and remediation module, the one or more computing system anomaly remediation actions on the computing system.

9. The non-transitory computer-readable medium of claim 8, wherein the operations further comprise:

in response to determining that the one or more unique identifiers are missing from the selected computing system layer or component, assessing, by a third application associated with the assessment and remediation module, a subset of communications network construction or operational parameters related to the selected computing system layer or component or the upstream computing system layer or component, to determine one or more communications network remediation actions; and executing, by a fourth application associated with the assessment and remediation module, the one or more communications network remediation actions on the communications network.

10. The non-transitory computer-readable medium of claim 9, wherein the operations further comprise executing the one or more communications network remediation actions only after execution of any computing system remediation actions.

11. The non-transitory computer-readable medium of claim 8, wherein the operations further comprise executing the one or more computing system remediation actions at one of the selected computing system layer or component or a computing system layer or component that is upstream of the selected computing system layer or component.

12. The non-transitory computer-readable medium of claim 8, wherein the one or more computing system anomaly remediation actions further comprise resending, to the selected computing system layer or component from an upstream computing system layer or component, transaction data containing the missing one or more unique identifiers.

13. The non-transitory computer-readable medium of claim 8, wherein the operations further comprise determining that the one or more unique identifiers are missing from other layers or components of the computing system that are downstream from the selected computing system layer or component.

14. The non-transitory computer-readable medium of claim 8, wherein the computing system is a remote deposit capture computing system and the transaction data includes both alphanumeric deposit data and digitized check image data.

15. A method of detecting and remediating anomalies in a computing system, the method comprising:

receiving, at a computerized tool, from the computing system, transaction data for one or more transactions initiated via the computing system;

generating, by the computerized tool, a unique identifier comprising a combination of selected items of information extracted from the transaction data received by the computerized tool for each transaction, and assigning each unique identifier to a corresponding transaction;

identifying, by the computerized tool, a likely location of a computing system anomaly by determining that one or more unique identifiers are missing from a selected computing system layer or component by comparing one or more unique identifiers represented in transaction data received at the selected computing system layer or component with one or more unique identifiers represented in transaction data received at an upstream computing system layer or component;

initiating, by the computerized tool, a testing operation comprising transmitting test data from the upstream computing system layer or component to the selected computing system layer or component;

analyzing the testing operation by the computerized tool and identifying a type of the computing system anomaly as a computing system hardware problem, a computing system application problem, or a corrupted or missing transaction data problem;

in response to identifying the computing system anomaly type, assessing, by a first application associated with an assessment and remediation module of the computerized tool, a subset of computing system construction or operational parameters related to the computing system anomaly type to determine one or more computing system anomaly remediation actions; and executing, by a second application associated with the assessment and remediation module, the one or more computing system anomaly remediation actions on the computing system.

16. The method of claim 15, further comprising:

in response to determining that the one or more unique identifiers are missing from the selected computing system layer or component, assessing, by a third application associated with the assessment and remediation module, a subset of communications network construction or operational parameters related to the selected computing system layer or component or the upstream computing system layer or component, and resultantly determining one or more communications network remediation actions; and executing, by a fourth application associated with the assessment and remediation module, the one or more communications network remediation actions on the communications network.

17. The method of claim 16, wherein the one or more network remediation actions are executed only after any computing system remediation actions have been executed.

18. The method of claim 15, wherein the one or more computing system remediation actions are executed at one of the selected computing system layer or component or a computing system layer or component that is upstream of the selected computing system layer or component.

19. The method of claim 15, wherein the one or more computing system remediation actions further comprise resending, to the selected computing system layer or component from an upstream computing system layer or component, transaction data containing the missing one or more unique identifiers.

20. The method of claim 15, wherein the computing system is a remote deposit capture computing system that receives both alphanumeric deposit data and digitized check image data within the transaction data.

* * * * *